(12) United States Patent
Liu et al.

(10) Patent No.: US 12,489,448 B1
(45) Date of Patent: Dec. 2, 2025

(54) CHARGE PUMP FOR PHASE LOCKED LOOP WITH REDUCED LEAKAGE CURRENT

(71) Applicant: QUALCOMM Incorporated, San Diego, CA (US)

(72) Inventors: Hao Liu, San Diego, CA (US); Lejie Lu, San Diego, CA (US); Yu Song, San Diego, CA (US); Dong Ren, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 18/676,048

(22) Filed: May 28, 2024

(51) Int. Cl.
*H03L 7/099* (2006.01)

(52) U.S. Cl.
CPC .................... *H03L 7/099* (2013.01)

(58) Field of Classification Search
CPC ....................................... H03L 7/099
USPC ................. 331/16, 34, 8; 327/538
See application file for complete search history.

(56) References Cited

FOREIGN PATENT DOCUMENTS

EP 3171518 A1 * 5/2017 ............. H02M 3/07

OTHER PUBLICATIONS

Cheng S., et al., "Design and Analysis of an Ultrahigh-Speed Glitch-Free Fully Differential Charge Pump With Minimum Output Current Variation and Accurate Matching," IEEE Transactions on Circuits and Systems—II: Express Briefs, Sep. 2006, vol. 53 (9), pp. 843-847.

* cited by examiner

*Primary Examiner* — Arnold M Kinkead
(74) *Attorney, Agent, or Firm* — Loza & Loza, LLP

(57) ABSTRACT

Aspects of a charge pump with reduced leakage current are disclosed. An apparatus includes a main branch having two parallel lines of switches and a main branch output, a side branch coupled to the main branch having two parallel lines of switches and a side branch output and a charge pump output at which the main branch output and the side branch output are coupled together.

20 Claims, 6 Drawing Sheets

CHARGE PUMP FOR PHASE LOCKED LOOP WITH REDUCED LEAKAGE CURRENT

TECHNICAL FIELD

A charge pump for a phase-locked loop is described and, in particular, a charge pump with reduced leakage current.

BACKGROUND

A switched capacitor charge pump is used to provide Direct Current (DC) power to a wide range of different circuits. In some examples, a charge pump is used to provide a precisely controlled voltage to the control input of a Voltage-Controlled Oscillator (VCO). Charge pumps are small and inexpensive to fabricate in semiconductor circuitry. Switched capacitor charge pumps may be configured for a voltage step-up, a voltage step-down and for multi-level voltage outputs. Switched capacitor charge pumps notably avoid the cost of an external or even an integrated inductor that may be required for a buck converter or a flyback converter.

VCOs are used in a wide range of applications within integrated circuits for data clocks and processor clocks. In some applications, VCOs are driven at high frequencies to support high data rates, especially on serial data buses and differential data buses. One such application is within the context of a Phase-Locked Loop (PLL) Clock Data Recovery (CDR) circuit. Another application is for a SERDES (Serializer/Deserializer). For such a PLL, a single-ended charge pump is used. In other applications, a differential charge pump is used.

BRIEF SUMMARY

The following presents a summary of one or more implementations in order to provide a basic understanding of such implementations. This summary is not an extensive overview of all contemplated implementations and is intended to neither identify key or critical elements of all implementations nor delineate the scope of any or all implementations. Its sole purpose is to present some concepts of one or more implementations in a simplified form as a prelude to the more detailed description that is presented later.

A first aspect relates to an apparatus. The apparatus includes a charge pump. The charge pump includes a main branch having two parallel lines of switches and a main branch output. The charge pump includes a side branch coupled to the main branch having two parallel lines of switches and a side branch output. At a charge pump output the main branch output and the side branch output are coupled together.

A second aspect relates to an apparatus. The apparatus includes a phase locked loop. The phase locked loop includes a voltage-controlled oscillator configured to generate an oscillating signal output, a pre-scaler configured to scale the oscillating signal output as an output of the phase locked loop, a controller coupled to the output and configured to compare the output to a reference and to generate an up-control signal and a down control signal, and a charge pump configured to receive the up-control output and the down control output and to generate a control voltage in response thereto. The charge pump includes a main branch having two parallel lines of switches and a main branch output, a side branch coupled to the main branch having two parallel lines of switches and a side branch output, and a charge pump output at which the main branch output and the side branch output are coupled together.

A third aspect relates to a method. The method includes receiving a supply voltage at an input node of a charge pump, receiving an up-control signal at the charge pump, receiving a down control signal at the charge pump, activating a plurality of parallel up switches of a main branch of the charge pump in response to the up-control signal to charge a capacitor of an output filter, activating a plurality of parallel down switches of a main branch of the charge pump in response to the down control signal to discharge the capacitor, activating a plurality of parallel up switches of a side branch of the charge pump in response to the up-control signal to cancel leakage current from the main branch, and activating a plurality of parallel down switches of a side branch of the charge pump in response to the down control signal to cancel leakage current from the main branch.

To the accomplishment of the foregoing and related ends, the one or more implementations include the features hereinafter fully described and particularly pointed out in the claims. The following description and the annexed drawings set forth in detail certain illustrative aspects of the one or more implementations. These aspects are indicative, however, of but a few of the various ways in which the principles of various implementations may be employed and the described implementations are intended to include all such aspects and their equivalents.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, these concepts may be practiced without these specific details. In some instances, well-known structures and components are shown in block diagram form in order to avoid obscuring such concepts.

A PLL that uses a charge pump may offer a wide capture range for incoming signals without a systematic phase offset. There may be some phase offset when the charging current and the discharging current are not precisely matched.

Leakage current may also affect the performance of the PLL, especially at higher frequencies.

Figure 1:
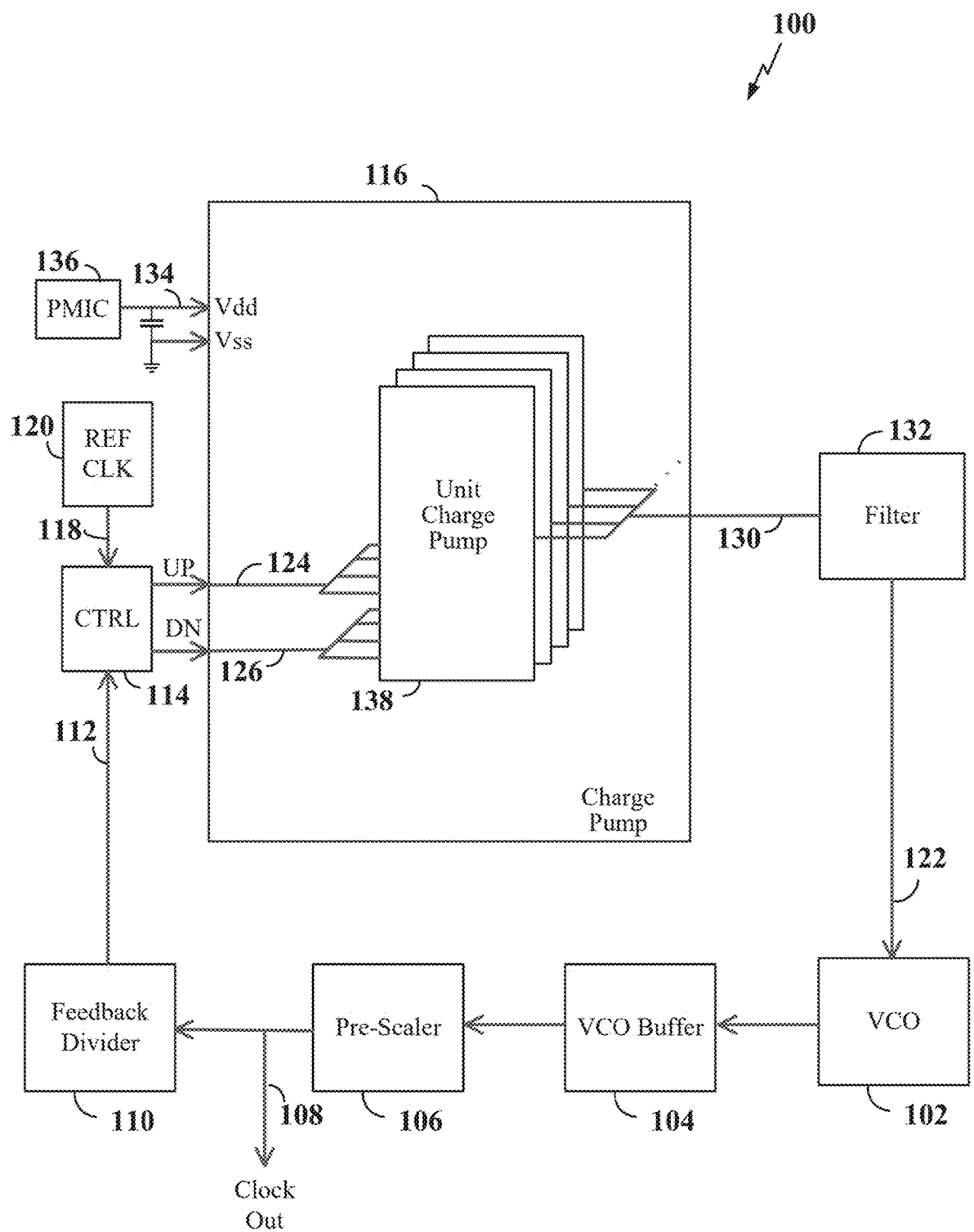
FIG. 1 is a is a block diagram of an example phase-locked loop (PLL) according to certain aspects of the present disclosure.

FIG. 1 is a block diagram of an example phase-locked loop (PLL) 100. A charge pump 116 generates a control current 130 that is converted to a control voltage 122 at a filter 132. The filter 132 may also be referred to as a loop filter. The control voltage 122 is output to a VCO 102 from the filter 132. The control voltage 122 controls the frequency of the output of the VCO 102 which determines the frequency of the clock output 108. The clock output 108 is input to a feedback divider 110 to generate a feedback control signal 112 that is provided as an input to a controller 114. The controller 114 adjusts the control current 130 of the charge pump 116.

The VCO 102 has an oscillating output signal at a controlled frequency that is coupled to a VCO buffer 104. The VCO buffer 104 is coupled to the VCO output to isolate the VCO 102 from the load of the PLL 100 and other circuits that are coupled to receive the clock output 108. The VCO buffer 104 may also amplify the signal swing and correct any duty cycle distortions of the output of the VCO 102. The VCO buffer 104 has an output coupled to a Pre-Scaler 106 that scales the buffered output signal of the VCO 102 as appropriate to generate the clock output 108 of the PLL 100. The PLL 100 may be used as a clock or with a bus driver for any of a variety of different purposes including for internal and external bus communications, including Peripheral Component Interconnect express (PCIe) and Universal Serial Bus (USB), for transmitters and receivers and for any other suitable purpose.

The controller 114 may include a phase frequency detector (PFD) and other components that are configured to provide an up pulse signal 124 to increase the control current 130 of the charge pump 116, and a down pulse signal 126 to decrease the control current 130 of the charge pump 116. The up pulse signals 124 and the down pulse signals 126 may be generated in response to a phase offset between the feedback signal 112 and a reference frequency signal 118 from a reference clock 120. For example, if there is a phase difference between the feedback signal 112 and the reference frequency signal 118, the controller 114 generates the up pulse signals 124 and the down pulse signals 126 which are provided to the charge pump 116 to adjust the control current 130. Switches in the charge pump 116 are controlled by the up pulse signal 124 and the down pulse signal 126 from the controller 114, and the filter 132 may reject any high frequency transient signals from this switching activity.

For example, if the up pulse signal 124 from the controller 114 is a logic high, then the charge pump 116 may pump charge onto a capacitor of the filter 132, which increases the voltage control voltage 122, e.g., a filtered VCO control input. If the down pulse signal 126 from the controller 114 is a logic high, the charge pump 116 may remove charge from the capacitor of the filter 132, which in turn decreases the voltage of the control voltage 122. In this way, the filter 132 may store the charge provided by the charge pump 116 and may provide DC signals to the VCO 102. The filter 132 may be external, as shown, or may be integrated into the charge pump 116.

The charge pump 116 may include multiple unit charge pumps 138 connected in parallel. The multiple unit charge pumps each contribute to the total current supplied as the control current 130 to the filter 132. In some implementations, there may be 4, 8, 16, 32, or any other suitable number of unit charge pumps. Each unit charge pump 138 includes a plurality of up switches (not shown) controlled by the up pulse signal 124 from the controller 114. These switches selectively control a current as the control current 130 from a current source flowing into a capacitor of the filter 132. A plurality of down switches (not shown) is controlled by the down pulse signal 126 from the controller 114, which selectively control a discharge current as the control current 130 flowing from the filter 132 capacitor to a reference potential (e.g., an electrical ground). The current source may be a power supply rail 134 or two power supply rails for a differential charge pump: a positive supply rail and a negative supply rail. The power supply rail 134 is supplied by a power management IC (PMIC) 136 from an external current source. The VCO 102 may also receive power via the power supply rail 134.

A single-ended charge pump 116 as shown, generates a single output voltage for the VCO relative to ground. For some applications, a fully differential charge pump (FDCP) includes separate charge pump branches to generate a positive voltage output (VOP) and a negative voltage output (VON) of the differential signals output by the FDCP. Each charge pump branch includes UP and DN switches controlled by a PFD. That is, an FDCP may include a first set of UP and DN switches for the charge pump branch configured to generate the positive voltage output (VOP), and second set of UP and DN switches for the charge pump branch configured to generate the negative voltage output (VON).

In certain aspects of the present disclosure, the charge pump 116 may be a fully differential charge pump having a switched-capacitor (SC) common-mode feedback (CMFB) circuit. In some aspects of the present disclosure, as illustrated in FIG. 1, the control voltage 122 for the VCO 102 may be provided by the charge pump 116 and the filter 132, such as a low-pass loop filter, via differential VCO control inputs.

Figure 2:
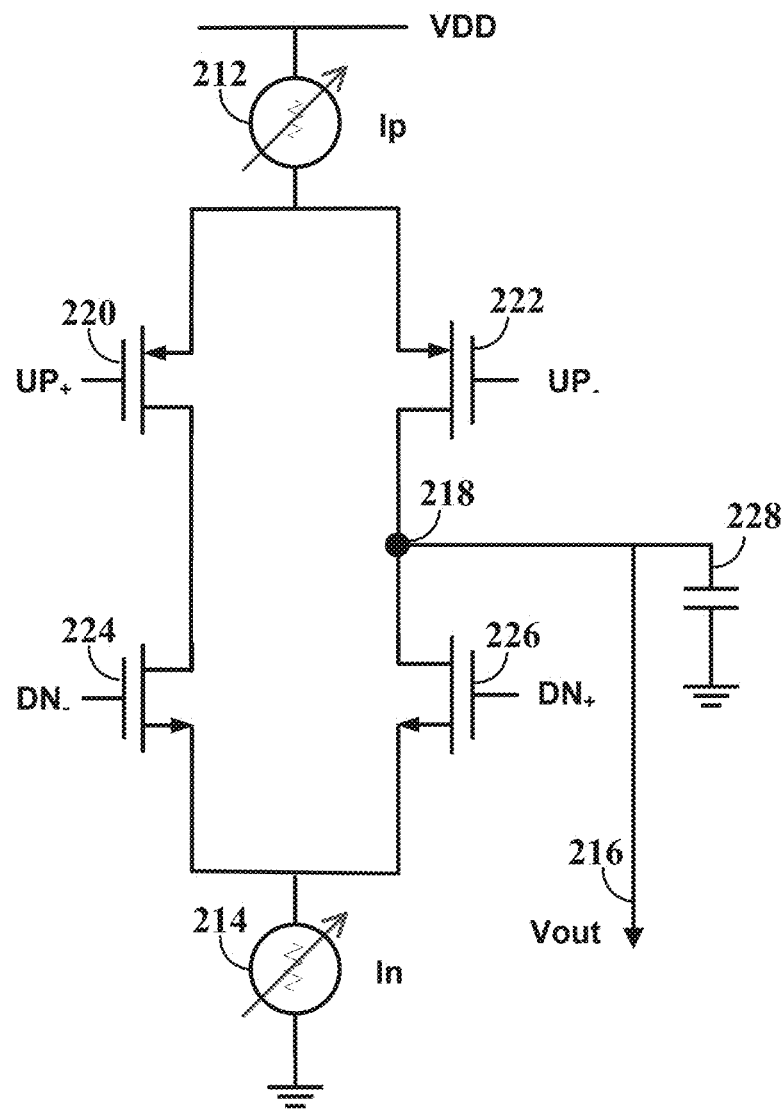
FIG. 2 is a simplified circuit diagram of a voltage regulation charge pump according to certain aspects of the present disclosure.

FIG. 2 is a simplified circuit diagram of a voltage regulation charge pump suitable for use as a charge pump 116 or a unit charge pump 138 with the PLL of FIG. 1. The charge pump 200 has four switches, which can be implemented with transistors, e.g., metal oxide semiconductor field effect transistor (MOSFET) switches, diodes, or any other suitable circuit coupled between a supply voltage, e.g. VDD and a low potential, e.g., VSS or ground. The switches are arranged as a right-side serial pair connected in parallel to a left-side serial pair. The pairs are connected between a supply voltage, VDD, and a ground or other lower voltage. The output 216, e.g., control voltage 122 of FIG. 1, is provided from a node 218 between the two transistors of the left side serial pair. A capacitor 228 coupled to the node 218 serves as a filter, e.g., the filter 132 of FIG. 1, and may be internal or external to the charge pump 200.

An UP+ switch 220 is an p-type MOSFET (PMOS) with a source coupled to the supply voltage through a variable resistor 212. A DN− switch 224 is an n-type MOSFET (NMOS) with a source coupled to the ground through a second variable resistor 214 and a drain coupled to the drain of the UP+ switch 220. An UP− switch 222 is a PMOS coupled in parallel with the UP+ switch 220 also with a source coupled to the supply voltage through the variable resistor 212. A DN+ switch 226 is an NMOS coupled in parallel with the DN− switch 224 with a drain coupled to the drain of the UP− switch and a source coupled to the ground through the second variable resistor 214. An output node 218 between the drain of the UP− switch 222 and the DN+ switch 226 is coupled to the output 216 of the charge pump 200. The capacitor 228 is also coupled to the output node 218 on one side and to ground or the low potential on the other side.

In operation, up (UP) control signals 124 and down (DN) control signals 126 from the controller 114 of FIG. 1 are applied to the four switches to operate the corresponding switches. The switches are operated in inverse fashion so that an up control signal 124 opens the UP+ switch 220 and closes the UP− switch 222. A negative up control switch operates in the inverse manner. Similarly, a down control signal 126 opens the DN+ switch 226 and closes the DN− switch 224. By operating these switches, the charge on the capacitor 228 is changed by allowing a charging or discharging current at the node 218. The charging or discharging current changes the voltage of the output voltage Vout at the output 216, which changes the frequency of the VCO 102.

The charge pump 200 may have more or fewer components than shown including startup circuits, output power filters and conditioners, current and voltage regulators, additional capacitors, etc. The output 216 is single-ended and is suitable for operating many different types of PLL circuits.

Integrated circuits continue to offer higher density or more transistors in less space to increase speed and reduce power consumption. Higher densities require smaller integrated circuit features with less intervening space between features. As a result, variations, or inaccuracies, in the manufacturing process have a greater impact on the operation of the circuits. In addition, leakage current increases. The capacitor is less able to hold a charge and the difference between an on state and an off state of each switch is reduced. For a very high speed charge pump, total current is minimized to increase switching speed and reduce power consumption. The small current is affected still more by the process variations and leakage current. For some applications, e.g., PCIe, the PLL may provide frequencies from 1.25 GHz to 16 GHz.

Figure 3:
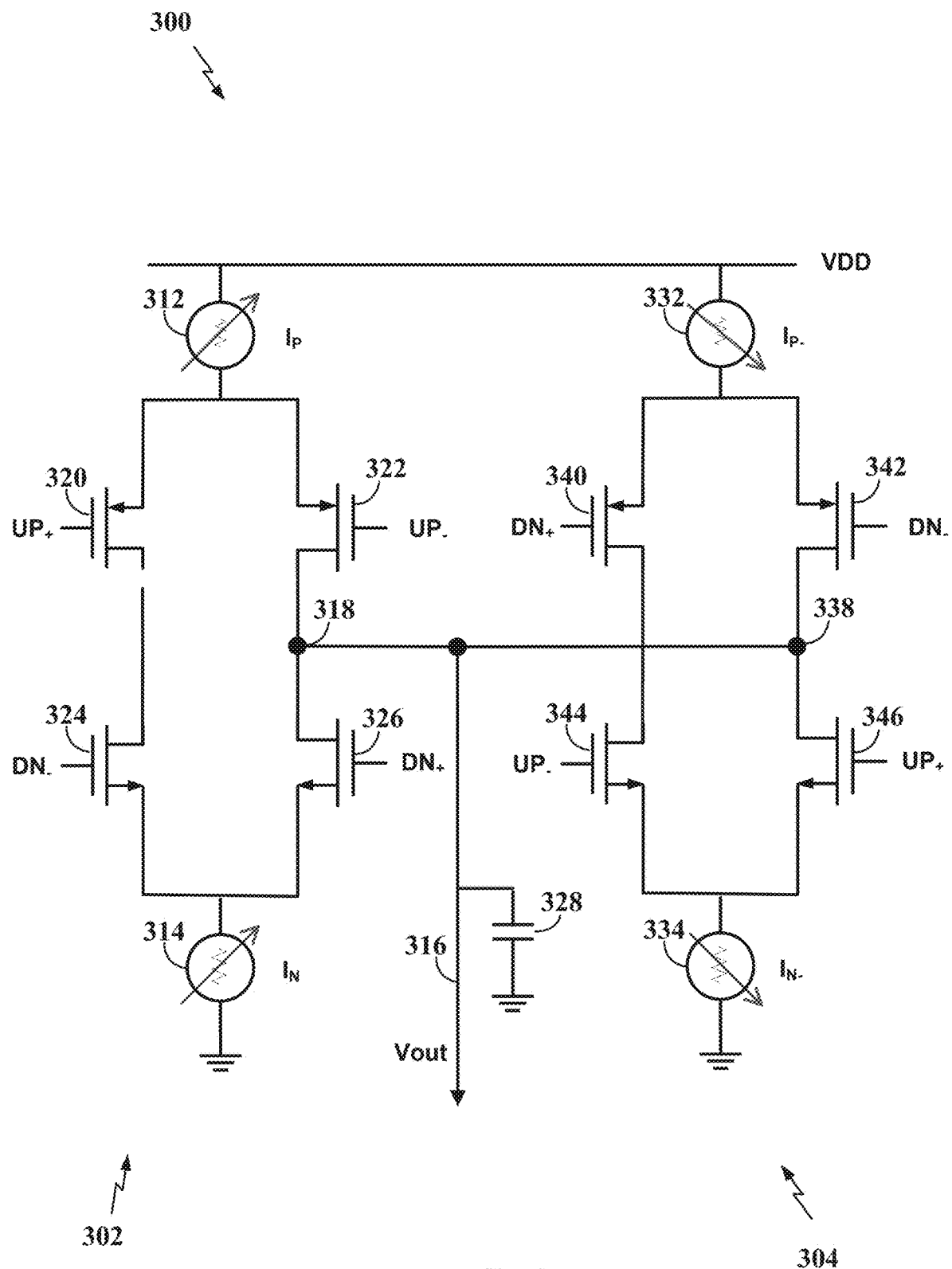
FIG. 3 is a simplified circuit diagram of a voltage regulation charge pump with a main branch and a side branch according to certain aspects of the present disclosure.

FIG. 3 is a simplified circuit diagram of a voltage regulation charge pump 300 with a main branch 302 and a side branch 304. The side branch 304 eliminates much of the leakage of the main branch 302 by using a complementary circuit that cancels the leakage current flow. The side branch 304 is a dummy branch as the main branch 302 is still controlling the charge and discharge of the capacitor 328 and therefore the output voltage Vout at the charge pump output 316. The charge pump output 316 is coupled to a capacitor 328 as in the example of FIG. 2, however, the side branch 304 allows a smaller capacitor to be used with no loss in speed or voltage range. The smaller capacitor reduces the total size of the circuit and the cost of the charge pump 300.

The main branch 302 is the same as or similar to the charge pump 200 of FIG. 2. Four switches are coupled as serial pairs in two parallel lines between the high potential and the low potential. An UP+ switch 320 is an PMOS with a source coupled to the supply voltage through a variable resistor 312. A DN− switch 324 is a NMOS with a source coupled to the ground through a second variable resistor 314 and a drain coupled to the drain of the UP+ switch 320. An UP− switch 322 is an PMOS coupled in parallel with the UP+ switch 320 also with a source coupled to the supply voltage through the variable resistor 312. A DN+ switch 326 is a NMOS coupled in parallel with the DN− switch 324 with a drain coupled to the drain of the UP− switch 322 and a source coupled to the ground through the second variable resistor 314. An output node 318 between the drain of the UP− switch 322 and the DN+ switch 326 is coupled to the charge pump output 316 of the charge pump 300. A capacitor 328 is also coupled to the charge pump output 316 on one side and to ground or the low potential on the other side.

The side branch 304 has the same electrical structure as the main branch 302 with complementary parallel NMOS switches coupled in series with complementary PMOS switches between the supply voltage, VDD, and ground through variable resistors. The control signal connections are inverted in comparison to the main branch 302 so that the down switches are coupled to the supply voltage and the up switches are coupled to ground. The high potential or supply voltage and the low potential or ground are the same as for the main branch. Four switches are also coupled in serial pairs in two parallel lines between the high potential and the low potential.

A side DN+ switch 340 is an PMOS with a source coupled to the supply voltage through a side variable resistor 332. A side UP− switch 344 is a NMOS with a source coupled to the ground through a side second variable resistor 334 and a drain coupled to the drain of the side DN+ switch 340. A side DN− switch 342 is an PMOS coupled in parallel with the side DN+ switch 340 also with a source coupled to the supply voltage through the side variable resistor 332. A side UP+ switch 346 is a NMOS coupled in parallel with the side UP− switch 344 with a drain coupled to the drain of the side DN− switch 342 and a source coupled to the ground through the side branch second variable resistor 334. An output node 338 between the drains of the side DN− switch 342 and the side UP+ switch 346 is also coupled to the charge pump output 316. As compared to some differential circuits, there is one single-ended output, the charge pump output 316.

The main branch 302 and the side branch 304 are also connected through the two nodes 318, 338 and through the gates of the switches so that, e.g., the UP+ switch 320 is coupled to the side UP+ switch 346 through the control signals that regulate both switches at the same time. The same may be true of each of the four switch types, e.g., UP+, UP−, DN+, DN−.

In operation the UP+ switch 320 and the side UP+ switch 346 are operated together. In the same way, the UP− switch 322 and the side UP− switch 344 are paired. The DN+ switch 326 and the side DN+ switch 340 are paired. The DN− switch 324 and the side DN− switch 342 are paired. With this complementary construction and operation as shown, leakage from one switch is canceled by opposing leakage from the corresponding paired switch.

In use, when there are multiple unit charge pumps, then a small leakage current may be generated by each of the unused unit charge pumps. The leakage current is increased when there are more unit charge pumps to allow the charge pump to generate a higher voltage. If there are 16 unit charge pumps but only a low voltage is generated using, e.g., 2 of the unit charge pumps, then there may be 14 unit charge pumps that are not used but that are generating a leakage current. In this example, the leakage current from the 14 unused unit charge pumps may be more than the desired current from the 2 used unit charge pumps.

When the desired current is not significantly greater than the undesired current, then the output signal is not clear. Undesired leakage current will flow through the second variable resistor 314 to ground. This can offset the desired current flow to the capacitor 328. With the side branch 304, an offset amount of leakage current flows through the side branch variable resistor 334 to cancel the impact in the conversion from current to the capacitor 328 to the voltage of the charge pump output 316.

The variable resistors may be used to adjust current ratios between the main branch and the side branch. In a scenario in which the charge pump generates a small current, the settings of the second variable resistor 314 and the side branch second variable resistor 334 may be set to similar intermediate resistance values. The variable resistors are independently variable to adjust current flow to the capacitor 328 and the charge pump output 316. With a slightly higher resistance on the main branch, the desired current will flow to the capacitor 328 with little effect from the leakage current. For high current scenarios, the resistance values may be increased because less of the transistors are unused and the leakage current is much less.

Figure 4:
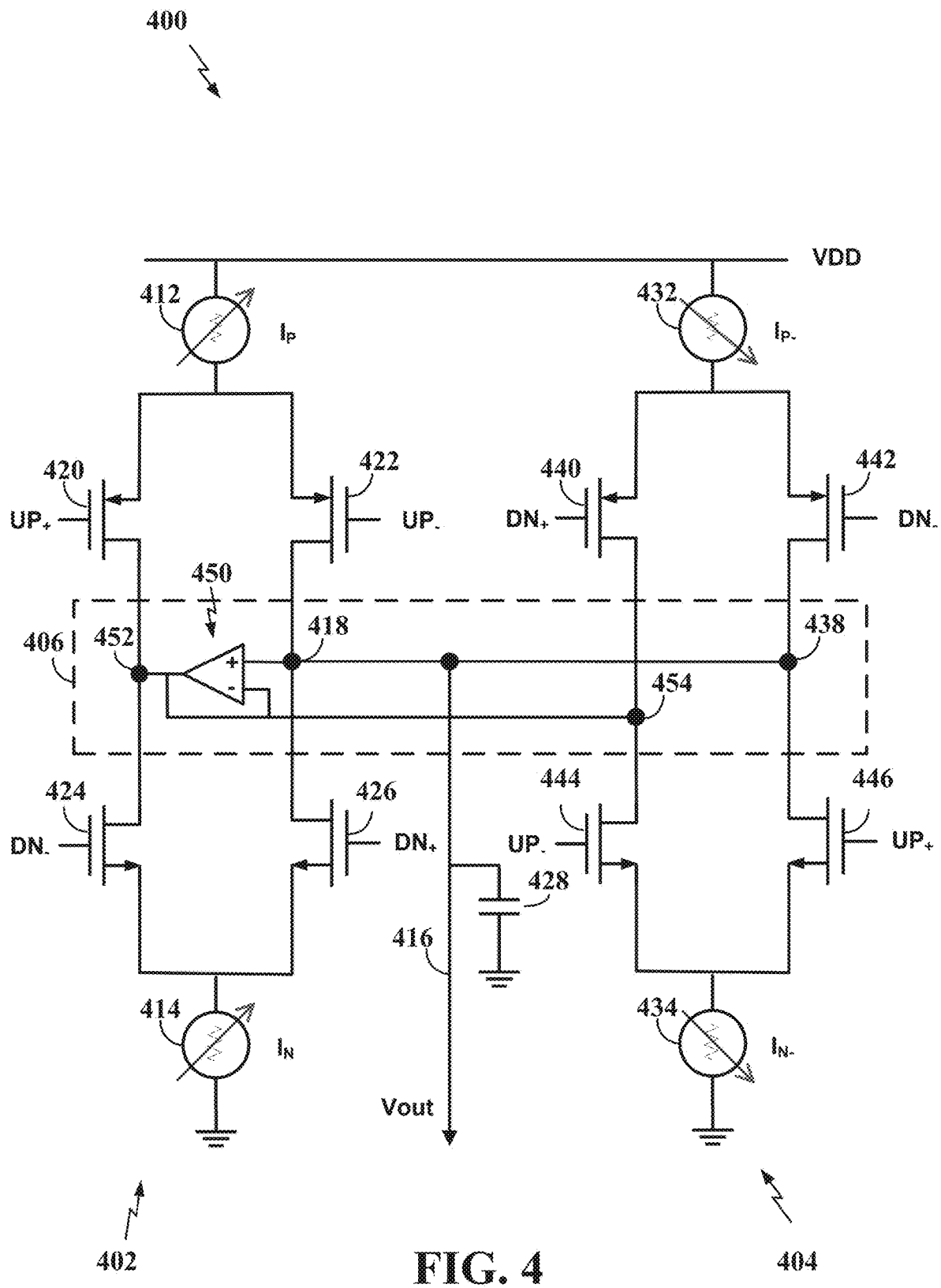
FIG. 4 is a simplified circuit diagram of a voltage regulation charge pump with a main branch and a side branch with low-speed glitch correction according to certain aspects of the present disclosure.

FIG. 4 is a simplified circuit diagram of a voltage regulation charge pump 400 with a main branch 402 and a side branch 404. The charge pump 400 is the same as or similar to the charge pump 300 of FIG. 3 with an added low-speed glitch correction circuit 406. Many different glitch correction and other correction circuits may be used together with the charge pump design as described in the context of FIG. 3.

The main branch 402 is the same as or similar to the charge pump 200 of FIG. 2. Four switches are coupled in serial pairs in two parallel lines between the high potential and the low potential. An UP+ switch 420 is an PMOS with a source coupled to the supply voltage through a variable resistor 412. A DN− switch 424 is a NMOS with a source coupled to the ground through a second variable resistor 414 and a drain coupled to the drain of the UP+ switch 420. An UP− switch 422 is an PMOS coupled in parallel with the UP+ switch 420 also with a source coupled to the supply voltage through the variable resistor 412. A DN+ switch 426 is a NMOS coupled in parallel with the DN− switch 424 with a drain coupled to the drain of the UP− switch 422 and a source coupled to the ground through the second variable resistor 414. An output node 418 between the drains of the UP− switch 422 and the DN+ switch 426 is coupled to the charge pump output 416. A capacitor 428 is also coupled to the charge pump output 416 on one side and to ground or the low potential on the other side.

For the side branch 404, a side DN+ switch 440 is an PMOS with a source coupled to the supply voltage through a side variable resistor 432. A side UP− switch 444 is a NMOS with a source coupled to the ground through a side second variable resistor 434 and a drain coupled to the drain of the side DN+ switch 440. A side DN− switch 442 is an PMOS coupled in parallel with the side DN+ switch 440 also with a source coupled to the supply voltage, VDD, through the side variable resistor 432. A side UP+ switch 446 is a NMOS coupled in parallel with the side UP− switch 444 with a drain coupled to the drain of the side DN− switch 442 and a source coupled to the ground through the side second variable resistor 434. An output node 438 between the drains of the side DN− switch 442 and the side UP+ switch 446 is also coupled to the charge pump output 416 of the charge pump 400. As compared to some differential circuits, there is one single-ended output, the charge pump output 416.

In the implementation illustrated in FIG. 4, the low-speed glitch correction circuit 406 includes a comparator feedback circuit. A comparator 450 sends an output (hereinafter, the comparator output signal) to a node 452 between the drain of the UP+ switch 420 and the drain of the DN− switch 424. The comparator output signal is also a feedback input to the negative pole of the comparator 450. The negative pole of the comparator 450 is also coupled to a side node 454 of the side branch 404 in the corresponding junction between the drain of the side DN+ switch 440 and the drain of the side UP− switch 444. The positive pole of the comparator 450 is coupled to the charge pump output 416.

In operation, the low-speed glitch correction circuit 406 operates similar to other low-speed glitch correction for charge pumps, however, in this implementation that negative pole brings together the node 452 of the main branch 402 with the side node 454 of the side branch 404 that are directly coupled together through the feedback of the node 452. This allows the single comparator 450 to correct low-speed glitch for the main branch 402 and the side branch 404 with one simple circuit.

Figure 5:
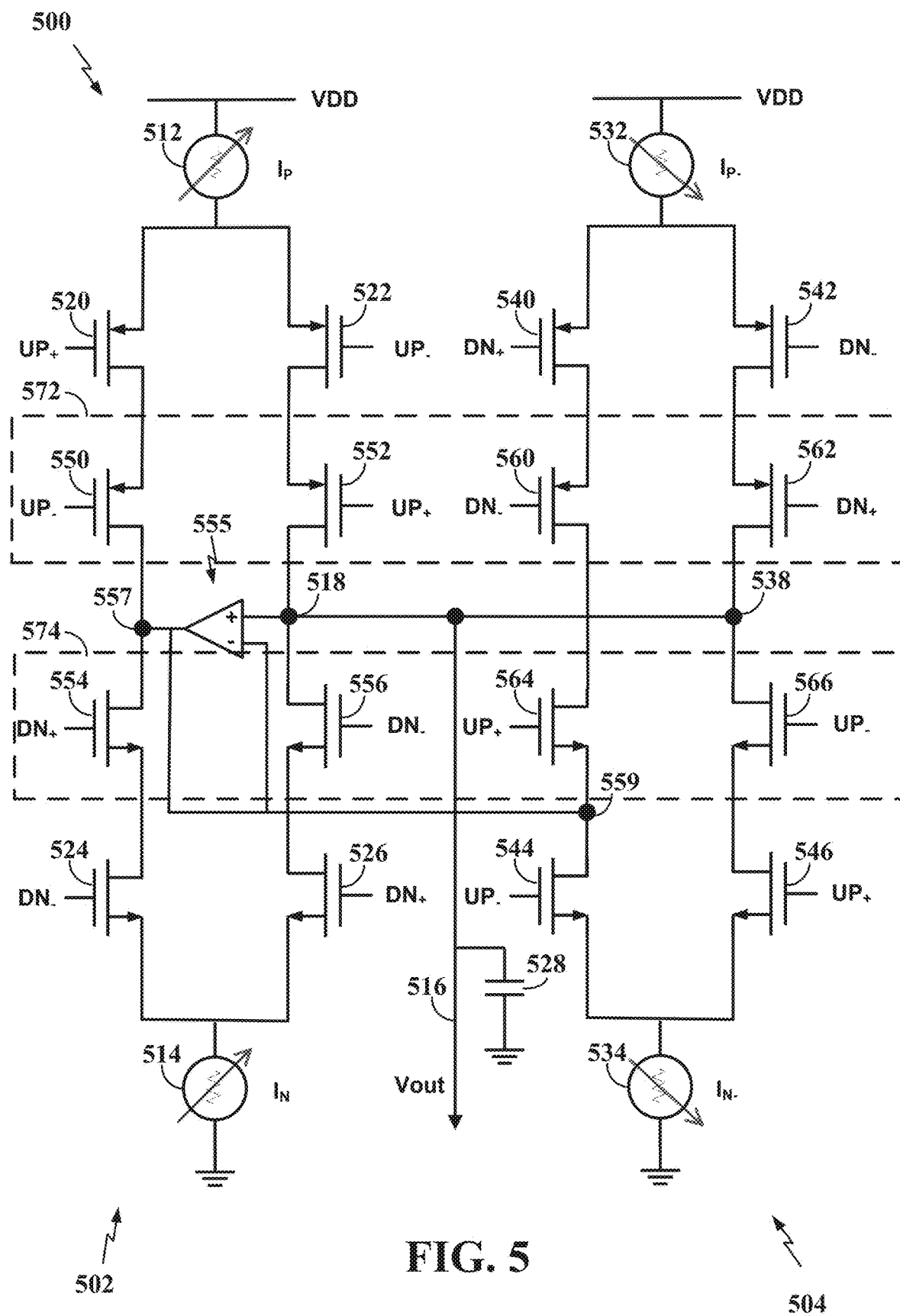
FIG. 5 is a simplified circuit diagram of a voltage regulation charge pump with a main branch and a side branch with high-speed glitch correction according to certain aspects of the present disclosure.

FIG. 5 is a simplified circuit diagram of a voltage regulation charge pump 500 with a main branch 502 and a side branch 504. The charge pump 500 is the same as or similar to the charge pump 400 of FIG. 4 with a high-speed glitch correction circuit having two additional parts 572, 574 as compared to the charge pump 400 of FIG. 4 that does not have this high-speed glitch correction features. The added glitch correction circuit parts 572, 574 are examples of glitch correction that may be used. Other glitch correction circuits may be used. The illustrated glitch correction circuits are specifically adapted for use with the single-ended charge pump designs shown herein.

The charge pump 500 includes all of the components shown in the example charge pump 400 of FIG. 4. However, as in the other examples, modifications and adaptations may be made to suit different applications. The main branch 502 and the side branch 504 each have eight switches coupled in serial groups of four in two parallel lines between the high potential and the low potential. An UP+ switch 520 is an PMOS with a source coupled to the supply voltage through a variable resistor 512. A DN− switch 524 is a NMOS with a source coupled to the ground through a second variable resistor 514. An UP− switch 522 is an PMOS coupled in parallel with the UP+ switch 520 also with a source coupled to the supply voltage through the variable resistor 512. A DN+ switch 526 is a NMOS coupled in parallel with the DN− switch 524 with a source coupled to the ground through the second variable resistor 514.

High-speed glitch is generated, at least in part, by charging or discharging the gate-to-drain capacitance of the output transistors 522, 526, which injects current into the output node. At high frequencies, the current generated by high-speed charging and discharging may exceed the output current. This capacitive current may be reduced by keeping the output transistors operating in the saturation region and out of the triode region.

A first part 572 of the high-speed glitch correction circuit includes a duplicate of the upper two switches, the UP+ switch 520 and the UP− switch 522 of the main branch 502. The second part 574 includes a duplicate of the lower two switches, the DN− switch 524 and the DN+ switch 526 of the main branch 502. However, the polarities are reversed so that the switches of the high-speed glitch correction circuit are operated opposite to those already present. The first part and the second part are coupled between the two upper switches and the lower two switches in the respective branches. Specifically, for a first serial group of four switches in the main branch 502, a glitch UP− switch 550 is an PMOS with a source coupled to the drain of the UP+ switch 520 and a drain coupled to a drain of a glitch DN− switch 554, a NMOS switch. The source of the glitch DN− switch 554 is coupled to the drain of the DN− switch 524. For a second serial group of four switches in the main branch, a glitch UP+ switch 552 is an PMOS with a source coupled to the drain of the UP− switch 522 and a drain coupled to a drain of a glitch DN− switch 556.

An output node 518 between the drains of the glitch UP+ switch 552 and the glitch DN− switch 556 is coupled to a charge pump output 516 of the charge pump 500. A capacitor 528 is also coupled to the output node 518 on one side and to ground or the low potential on the other side. In operation, the source terminals of the UP+ switch 520 and the DN− switch 524 are left floating to avoid extra DC current. The size of the connected transistors, the glitch UP− switch 550 and the flitch DN+ switch 554 may be configured to match the size of the UP+ switch 520 and the DN− switch 524. When both the UP+ switch 520 and the DN− switch 524 stay in the saturation region, they have the same gate-to-drain overlap capacitance. Thus, the glitches on the discharging current induced by the switching cancel each other out.

For the side branch 504, a side DN+ switch 540 is an PMOS with a source coupled to the supply voltage through a side variable resistor 532. A side UP− switch 544 is a NMOS with a source coupled to the ground through a side second variable resistor 534. The glitch correction circuit is coupled between these two switches as with the main branch 502. The drain of the side DN+ switch 540 is coupled to the source of a side glitch DN− switch 560. The drain of the side glitch DN− switch 560 is coupled to the drain of a side glitch UP+ switch 564 and the source of the side glitch UP+ switch 564 is coupled to the drain of the side UP− switch 544. That completes the left-side four serial switches of the side branch.

Four serial switches of the right side of the side branch 504 are coupled in parallel to the right side. A side DN− switch 542 is an PMOS coupled in parallel with the side DN+ switch 540 also with a source coupled to the supply voltage through the side variable resistor 532. A side UP+ switch 546 is a NMOS coupled in parallel with the side UP− switch 544 with a source coupled to the ground through the side second variable resistor 534. For the second serial group of four switches in the side branch 504, a side glitch DN+ switch 562 is an PMOS with a source coupled to the drain of the DN− switch 542 and a drain coupled to a drain of a side glitch UP− switch 546, a NMOS switch. The source of the glitch UP− switch 566 is coupled to the drain of the UP+ switch 546.

The first part 572 of the high-speed glitch correction circuit includes a duplicate of the upper two switches, the side DN+ switch 540 and the side DN− switch 542 of the side branch 504. The second part 574 includes a duplicate of the lower two switches, the side UP− switch 544 and the side UP+ switch 546 of the side branch 504. In the glitch correction circuit in both parts 572, 574, however, the polarities are reversed so that the switches of the high-speed glitch correction circuit are operated opposite to those already present. The first part and the second part are coupled between the two upper switches of each branch and the lower two switches of each branch, between the upper two switches and the lower two switches.

An output node 538 between the drain of the side glitch DN+ switch 562 and the side glitch UP− switch 566 is also coupled to the charge pump output 516 of the charge pump 500. As in the examples of FIGS. 3 and 4, this connects the main branch 502 and the side branch 504 to reduce or even cancel the leakage current. The main branch 502 and the side branch 504 are also connected through the gates of the switches so that, e.g., the UP+ switch 520 is coupled to the side UP+ switch 546 through the control signals that regulate both switches at the same time. In this example, the glitch UP+ switch 552 and the side glitch UP+ switch 564 are also coupled together with the UP+ switch 520 and the side UP+ switch 546 through the controller. The same may be true of each of the four other switch types, e.g., UP+, UP−, DN+, DN−.

The low-speed glitch correction circuit uses a comparator 555 to generate an output to a node 557 between the drain of the glitch UP− switch 550 and the drain of the glitch DN+ switch 554. The output is a feedback input to the negative pole of the comparator. The negative pole of the comparator 555 is also coupled to a side node 559 of the side branch in the corresponding junction between the drain of the glitch side UP+ switch 564 and the drain of the side UP− switch 544. The positive pole of the comparator 555 is coupled to the charge pump output 516. This low-speed glitch correction circuit operates as in the example of FIG. 4 but with unique connections to accommodate the high-speed glitch correction circuit.

Figure 6:
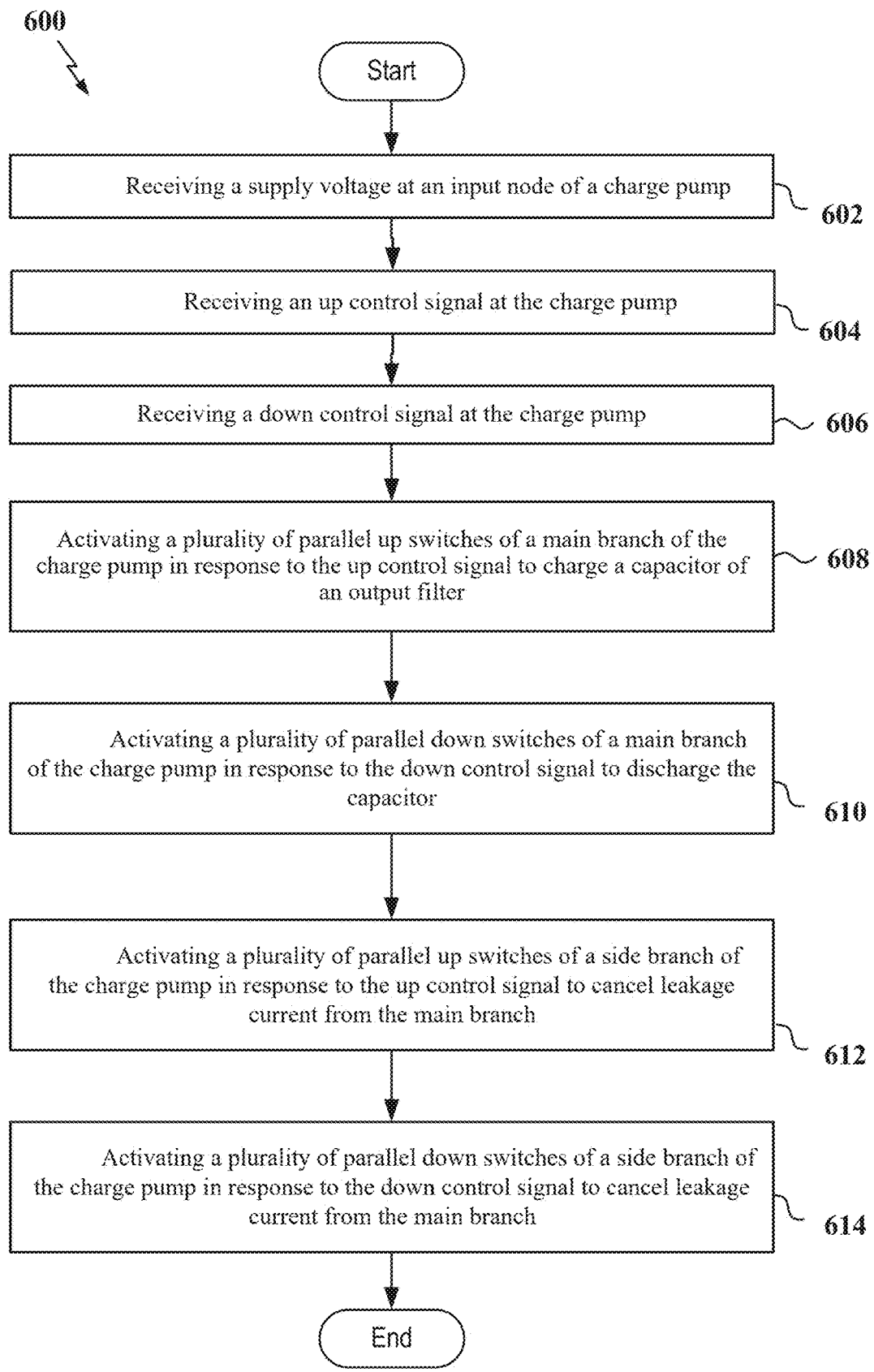
FIG. 6 is a process flow diagram of an example operation of a charge pump according to certain aspects of the present disclosure.

FIG. 6 is a process flow diagram of an example operation of the charge pump as described herein. At 602, a supply voltage is received at an input node of a charge pump. At 604, an up-control signal is received at the charge pump. At 606, a down control signal is received at the charge pump. At 608, a plurality of parallel up switches of a main branch of the charge pump are activated in response to the up-control signal to charge a capacitor of an output filter. At 610 a plurality of parallel down switches of a main branch of the charge pump are activated in response to the down control signal to discharge the capacitor. At 612, a plurality of parallel up switches of a side branch of the charge pump are activated in response to the up-control signal to cancel leakage current from the main branch. At 614 a plurality of parallel down switches of a side branch of the charge pump are activated in response to the down control signal to cancel leakage current from the main branch.

As used herein, "or" is intended to be interpreted in the inclusive sense, unless otherwise explicitly indicated. For example, "a or b" may include a only, b only, or a combination of a and b. As used herein, a phrase referring to "at least one of" or "one or more of" a list of items refers to any combination of those items, including single members. For example, "at least one of: a, b, or c" is intended to cover the examples of: a only, b only, c only, a combination of a and b, a combination of a and c, a combination of b and c, and a combination of a and b and c.

The various illustrative components, logic, logical blocks, modules, circuits, operations, and algorithm processes described in connection with the implementations disclosed herein may be implemented as electronic hardware, firmware, software, or combinations of hardware, firmware, or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

The various illustrative logical blocks, modules, and circuits described in connection with the exemplary aspects disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor may be a microprocessor and the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The following provides an overview of examples of the present disclosure.

Example 1: A charge pump comprising: a main branch having two parallel lines of switches and a main branch output; a side branch coupled to the main branch having two parallel lines of switches and a side branch output; and a charge pump output at which the main branch output and the side branch output are coupled together.

Example 2: The charge pump of example 1, wherein the switches of the side branch have a same configuration as the switches of the main branch except that connections to gates of the switches are reversed.

Example 3: The charge pump of example 2, wherein: the main branch has an UP+ switch coupled to a supply voltage and an UP− switch coupled to the supply voltage in parallel with the UP+ switch to be controlled by a pair of complementary up control signals; and the side branch has a DN+ switch coupled to the supply voltage and a DN− switch coupled to the supply voltage in parallel with the DN+ switch to be controlled by a pair of complementary down control signals.

Example 4: The charge pump of example 2 or 3, wherein: the main branch output is coupled between a drain of an UP− switch coupled to a supply voltage and a drain of a DN+ switch coupled to a ground, wherein the UP− and the DN+ switches are coupled in series; the side branch output is coupled between a drain of a DN− switch coupled to a supply voltage and a drain of an UP+ switch coupled to a ground, wherein the DN− and the UP+ switches are coupled in series; and wherein the UP− switch and the UP+ switch are controlled by a pair of complementary up control signals and the DN− and the DN+ switch are controlled by a pair of complementary down control signal.

Example 5: The charge pump of any one or more of the above examples, further comprising a filter having a capacitor coupled to the main branch output on one side and to ground on another side.

Example 6: The charge pump of any one or more of the above examples, wherein the filter converts current of the main branch output to a control voltage of the charge pump output.

Example 7: The charge pump of any one or more of the above examples 1, further comprising a variable resistor between the main branch and a ground and a side branch variable resistor between the side branch and ground, wherein the variable resistor and the side branch variable resistor are independently variable to adjust current flow to the charge pump output.

Example 8: The charge pump of any one or more of the above examples, further comprising a low-speed glitch correction circuit coupled to the two parallel lines of switches of the main branch and the two parallel lines of switches of the side branch.

Example 9: The charge pump of example 8, wherein the low-speed glitch correction circuit comprises a first input coupled to a first of the two parallel lines of switches of the main branch and to the first of the two parallel lines of switches of the side branch and a second input coupled to a second of the two parallel lines of switches of the main branch and to the second of the two parallel lines of switches of the side branch.

Example 10: The charge pump of example 9, wherein the low-speed glitch correction circuit comprises an output, the first input is coupled to the main branch output and the second input is coupled to the output of the low-speed glitch correction circuit.

Example 11: The charge pump of any one or more of the above examples, wherein the side branch is a dummy branch.

Example 12: The charge pump of any one or more of the above examples, further comprising a high-speed glitch correction circuit comprising a plurality of glitch switches coupled in series between switches of the first and of the second parallel lines of switches of the main branch and in series between switches of the first and of the second parallel lines of switches of the side branch.

Example 13: The charge pump of any one or more of the above examples, further comprising a duplicate main branch and a duplicate side branch to generate a differential-ended output.

Example 14 A phase locked loop comprising: a voltage-controlled oscillator configured to generate an oscillating signal output; a pre-scaler configured to scale the oscillating signal output as an output of the phase locked loop; a controller coupled to the output and configured to compare the output to a reference and to generate an up-control signal and a down control signal; and a charge pump configured to receive the up-control output and the down control output and to generate a control voltage in response thereto, the charge pump including: a main branch having two parallel lines of switches and a main branch output; a side branch coupled to the main branch having two parallel lines of switches and a side branch output; and a charge pump output at which the main branch output and the side branch output are coupled together.

Example 15: The phase locked loop of example 14, wherein the main branch output and the side branch output are coupled to a capacitor in parallel and configured to convert a current from the main branch output to a voltage for the control voltage.

Example 16: The phase locked loop of example 14 or 15, wherein the side branch is a dummy branch.

Example 17: The phase locked loop of any one or more of examples 14 to 16, wherein the charge pump further comprises a variable resistor between the main branch and a ground and a side branch variable resistor between the side branch and ground, wherein the variable resistor and the side branch variable resistor are independently variable to adjust current flow to the charge pump output.

Example 18: A method comprising: receiving a supply voltage at an input node of a charge pump; receiving an up-control signal at the charge pump; receiving a down control signal at the charge pump; activating a plurality of parallel up switches of a main branch of the charge pump in response to the up-control signal to charge a capacitor of an output filter; activating a plurality of parallel down switches of a main branch of the charge pump in response to the down control signal to discharge the capacitor; activating a plurality of parallel up switches of a side branch of the charge pump in response to the up-control signal to cancel leakage current from the main branch; and activating a plurality of parallel down switches of a side branch of the charge pump in response to the down control signal to cancel leakage current from the main branch.

Example 19: The method of example 18, further comprising converting the capacitor charge to a voltage of a charge pump output.

Example 20: The method of example 18 or 19, wherein the switches of the side branch have a same configuration as the switches of the main branch except that connections to gates of the switches are reversed.

What is claimed is:

1. A charge pump comprising:
 a main branch having two parallel lines of switches and a main branch output;
 a side branch coupled to the main branch having two parallel lines of switches and a side branch output;
 a charge pump output at which the main branch output and the side branch output are coupled together; and
 a variable resistor between the main branch and a ground and a side branch variable resistor between the side branch and ground,
 wherein the variable resistor and the side branch variable resistor are independently variable to adjust current flow to the charge pump output.

2. The charge pump of claim 1, wherein the switches of the side branch have a same configuration as the switches of the main branch except that connections to gates of the switches are reversed.

3. The charge pump of claim 2, wherein:
 the main branch has an UP+ switch coupled to a supply voltage and an UP− switch coupled to the supply voltage in parallel with the UP+ switch to be controlled by a pair of complementary up control signals; and
 the side branch has a DN+ switch coupled to the supply voltage and a DN− switch coupled to the supply voltage in parallel with the DN+ switch to be controlled by a pair of complementary down control signals.

4. The charge pump of claim 2, wherein:
 the main branch output is coupled between a drain of an UP− switch coupled to a supply voltage and a drain of a DN+ switch coupled to a ground, wherein the UP− and the DN+ switches are coupled in series;
 the side branch output is coupled between a drain of a DN− switch coupled to a supply voltage and a drain of an UP+ switch coupled to a ground, wherein the DN− and the UP+ switches are coupled in series; and
 wherein the UP− switch and the UP+ switch are controlled by a pair of complementary up control signals and the DN− and the DN+ switch are controlled by a pair of complementary down control signal.

5. The charge pump of claim 1, further comprising a filter having a capacitor coupled to the main branch output on one side and to ground on another side.

6. The charge pump of claim 1, wherein the filter converts current of the main branch output to a control voltage of the charge pump output.

7. The charge pump of claim 1, further comprising a low-speed glitch correction circuit coupled to the two parallel lines of switches of the main branch and the two parallel lines of switches of the side branch.

8. The charge pump of claim 7, wherein the low-speed glitch correction circuit comprises a first input coupled to a first of the two parallel lines of switches of the main branch and to the first of the two parallel lines of switches of the side branch and a second input coupled to a second of the two parallel lines of switches of the main branch and to the second of the two parallel lines of switches of the side branch.

9. The charge pump of claim 8, wherein the low-speed glitch correction circuit comprises an output, the first input is coupled to the main branch output and the second input is coupled to the output of the low-speed glitch correction circuit.

10. The charge pump of claim 1, wherein the side branch is a dummy branch.

11. The charge pump of claim 1, further comprising a high-speed glitch correction circuit comprising a plurality of glitch switches coupled in series between switches of the first and of the second parallel lines of switches of the main branch and in series between switches of the first and of the second parallel lines of switches of the side branch.

12. The charge pump of claim 1, further comprising a duplicate main branch and a duplicate side branch to generate a differential-ended output.

13. A phase locked loop comprising:
 a voltage-controlled oscillator configured to generate an oscillating signal output;
 a pre-scaler configured to scale the oscillating signal output as an output of the phase locked loop;
 a controller coupled to the output and configured to compare the output to a reference and to generate an up-control signal and a down control signal; and
 a charge pump configured to receive the up-control output and the down control output and to generate a control voltage in response thereto, the charge pump including:
 a main branch having two parallel lines of switches and a main branch output;
 a side branch coupled to the main branch having two parallel lines of switches and a side branch output;
 a charge pump output at which the main branch output and the side branch output are coupled together; and
 a variable resistor between the main branch and a ground and a side branch variable resistor between the side branch and ground, wherein the variable resistor and the side branch variable resistor are independently variable to adjust current flow to the charge pump output.

14. The phase locked loop of claim 13, wherein the main branch output and the side branch output are coupled to a capacitor in parallel and configured to convert a current from the main branch output to a voltage for the control voltage.

15. The phase locked loop of claim 13, wherein the side branch is a dummy branch.

16. A method comprising:
receiving a supply voltage at an input node of a charge pump;
receiving an up-control signal at the charge pump;
receiving a down control signal at the charge pump;
activating a plurality of parallel up switches of a main branch of the charge pump in response to the up-control signal to charge a capacitor of an output filter;
activating a plurality of parallel down switches of a main branch of the charge pump in response to the down control signal to discharge the capacitor;
activating a plurality of parallel up switches of a side branch of the charge pump in response to the up-control signal to cancel leakage current from the main branch; and
activating a plurality of parallel down switches of a side branch of the charge pump in response to the down control signal to cancel leakage current from the main branch.

17. The method of claim 16, further comprising converting the capacitor charge to a voltage of a charge pump output.

18. The method of claim 16, wherein the switches of the side branch have a same configuration as the switches of the main branch except that connections to gates of the switches are reversed.

19. The method of claim 16, wherein:
the main branch has an UP+ switch coupled to a supply voltage and an UP− switch coupled to the supply voltage in parallel with the UP+ switch to be controlled by the parallel up switches of the main branch; and
the side branch has a DN+ switch coupled to the supply voltage and a DN− switch coupled to the supply voltage in parallel with the DN+ switch to be controlled by the parallel down switches of the side branch.

20. The method of claim 16, wherein:
the main branch output is coupled between a drain of an UP− switch coupled to a supply voltage and a drain of a DN+ switch coupled to a ground, wherein the UP− and the DN+ switches are coupled in series;
the side branch output is coupled between a drain of a DN− switch coupled to a supply voltage and a drain of an UP+ switch coupled to a ground, wherein the DN− and the UP+ switches are coupled in series.

* * * * *